July 25, 1967  J. E. CHAPMAN III  3,333,237
ACOUSTIC WELL LOGGING DISPLAY METHODS AND APPARATUS
Filed Aug. 25, 1964  2 Sheets-Sheet 1

INVENTOR.
JOSEPH E. CHAPMAN, III
his ATTORNEYS

United States Patent Office 3,333,237
Patented July 25, 1967

3,333,237
ACOUSTIC WELL LOGGING DISPLAY
METHODS AND APPARATUS
Joseph E. Chapman III, Houston, Tex., assignor, by mesne assignments, to Schlumberger Technology Corporation, Houston, Tex., a corporation of Texas
Filed Aug. 25, 1964, Ser. No. 391,976
15 Claims. (Cl. 340—15.5)

The present invention relates to acoustic well logging methods and apparatus, and, more particularly, to photographic display means and techniques whereby a permanent record is made of the complete acoustic signal received from the downhole equipment.

In conventional logging techniques utilizing acoustic energy, the downhole logging tool or sonde includes one or more acoustic transmitters and one or more acoustic receivers whose operation is controlled by surface equipment. In general, a measurement is made by triggering the acoustic transmitter to emit a pulse of acoustic energy into the formations surrounding the borehole, and the receiver or receivers detect the acoustic energy impinging thereon after travel through the formations between the transmitter and receiver. Either the entire received signal is transmitted to the surface equipment from the tool or, alternatively, electronic equipment in the tool abstracts certain information from the received signal and transmits indications thereof to the surface.

In either case, the logs obtained from the equipment provide continuous indications, correlated with depth, of acoustic velocity (or travel time) through incremental portions (corresponding to the distance between a transmitter and receiver or between a pair of receivers) and/or the total travel time of acoustic energy through a substantial length of the formation surrounding the borehole. Another type of conventional log is obtained by selecting a particular segment of the received signal, measuring its amplitude, and plotting the amplitudes vs. depth in the well. As is well known, these logs provide valuable information relative to the character of the formations in which the borehole is located, or where the well is cased and cemented, the quality of the cement bond.

It has also been found that the complete waveform of the acoustic signal detected by an acoustic receiver in the borehole provides valuable information respecting the character of the formation, in addition to that obtained by conventional logs as discussed above. By having a complete representation of the received signal amplitude through a given segment of earth formation, the operator may derive important data relative to permeability of the formations, rock consolidation, fracture location, and other lithological characteristics that are of value in locating hydrocarbons in the formations. A sequence of such complete wave form representations, correlated with depth in the well, also provides valuable information with respect to cycle skipping and cement bond evaluation.

Since in many forms of acoustic well logging equipment, the complete received signal ordinarily is made available at the surface equipment, it is generally a simple matter to reproduce the received signal on the screen of an oscilloscope either continuously or with a periodicity related to the rate of movement of the logging tool through the well, and to photograph the individual wave forms on a film strip whose movement may be constant or may be synchronized with the movement of the logging tool. The result is a series of wave forms, one of which, for example, may be taken for each foot of travel of the sonde or tool through the well bore, which enable a careful comparative analysis after the logging run is completed.

In order to properly evaluate the acoustic wave form representations, it is of course necessary that a suitable time scale be provided, preferably right on the film strip itself, so that the times of occurrence of various portions of the received wave may be accurately determined. Heretofore, the superimposition of a time grid on the photographed wave forms has been accomplished by means of a graticule placed on the face of the cathode ray tube of the oscilloscope which is consequently photographed at the same time as the signal wave form. The use of such an arrangement requires, however, that the time base of the oscilloscope sweep be correlated with the graticule spacings and thus renders the arrangement somewhat inflexible and subject to error.

Furthermore, sweep distortion and/or malfunctions in the operation of the oscilloscope can render the spacing on the graticule inaccurate without apprising the operator of that fact. Finally, optical effects, such as parallax in the camera lens system and the scope face impart additional discrepancies in the relationship of the time grid to the acoustic signal display. As a result of these shortcomings, the amount of information that heretofore has been obtainable from the photographed acoustic signals has been reduced below its potential ability.

Accordingly, the principal object of the present invention is to provide novel and improved acoustic signal display methods and systems wherein the aforementioned shortcomings of the prior art systems are avoided.

Another object of the present invention is to provide improved display methods and systems for acoustic well logging apparatus in which a time base is developed on the oscilloscope screen itself whereby electronic and optical errors are cancelled out and thus minimized.

Yet another object of the present invention is to provide improved acoustic signal display techniques and apparatus in which a time base is displayed directly on the face of the cathode ray tube of an oscilloscope and in which the time base may be readily adjusted to increase the versatility of the system.

In accordance with the invention, an electrical signal corresponding to a complete acoustic measurement cycle, comprising a pulse indicating or related to the transmitter firing time and an alternating wave representative of the acoustic wave impinging upon the acoustic receiver, is applied to the vertical deflection plates of a cathode ray tube in an oscilloscope in well known manner. One such electrical signal may be selected for each given unit of travel of the tool through the borehole, or at any given time interval. Between successive displays, pulses whose repetition rate is proportional to a predetermined accurate time interval are supplied to the horizontal sweep trigger circuitry and intensity control circuitry of the oscilloscope to repetitively produce a series of dots representing equal time intervals across the face of the screen. A movie camera is mounted facing the screen of the oscilloscope thereby photographing the series of dots as well as the periodically recurring acoustic wave forms.

By virtue of the film motion, the persistence of the phosphor on the screen of the oscilloscope, and the high repetition rate at which the series of dots are produced on the scope, the photographic representation of the successive time dots produces a plurality of parallel spaced lines extending lengthwise of the film with the spacing between each adjacent line representing a fixed and equal increment of time. During the time that an acoustic signal representation is to be reproduced on the face of the tube, the timing dot circuitry is preferably blanked, so that no time base lines will be superimposed on the acoustic wave form signal to interfere with its legibility.

As will be recognized, since the time base dots are produced by the same cathode ray tube and associated electronic apparatus in the oscilloscope that produces the acoustic wave form representation, any sweep timing distortion occurring therein will appear to equal extent in both. Therefore, relative to each other, no inaccuracies result. Furthermore, since the time base lines appear on the same surface as the acoustic signal display, i.e., the phosphor screen of the cathode ray tube of the oscilloscope, no optical distortion therebetween can occur. The time base dots are generated electronically by readily adjustable apparatus and can be changed at will to provide different but equally accurate time scales.

Other objects, features, and advantages of the present invention will become more apparent from the following more detailed description thereof, when read in conjunction with the accompanying drawings, in which.

Figure 1:
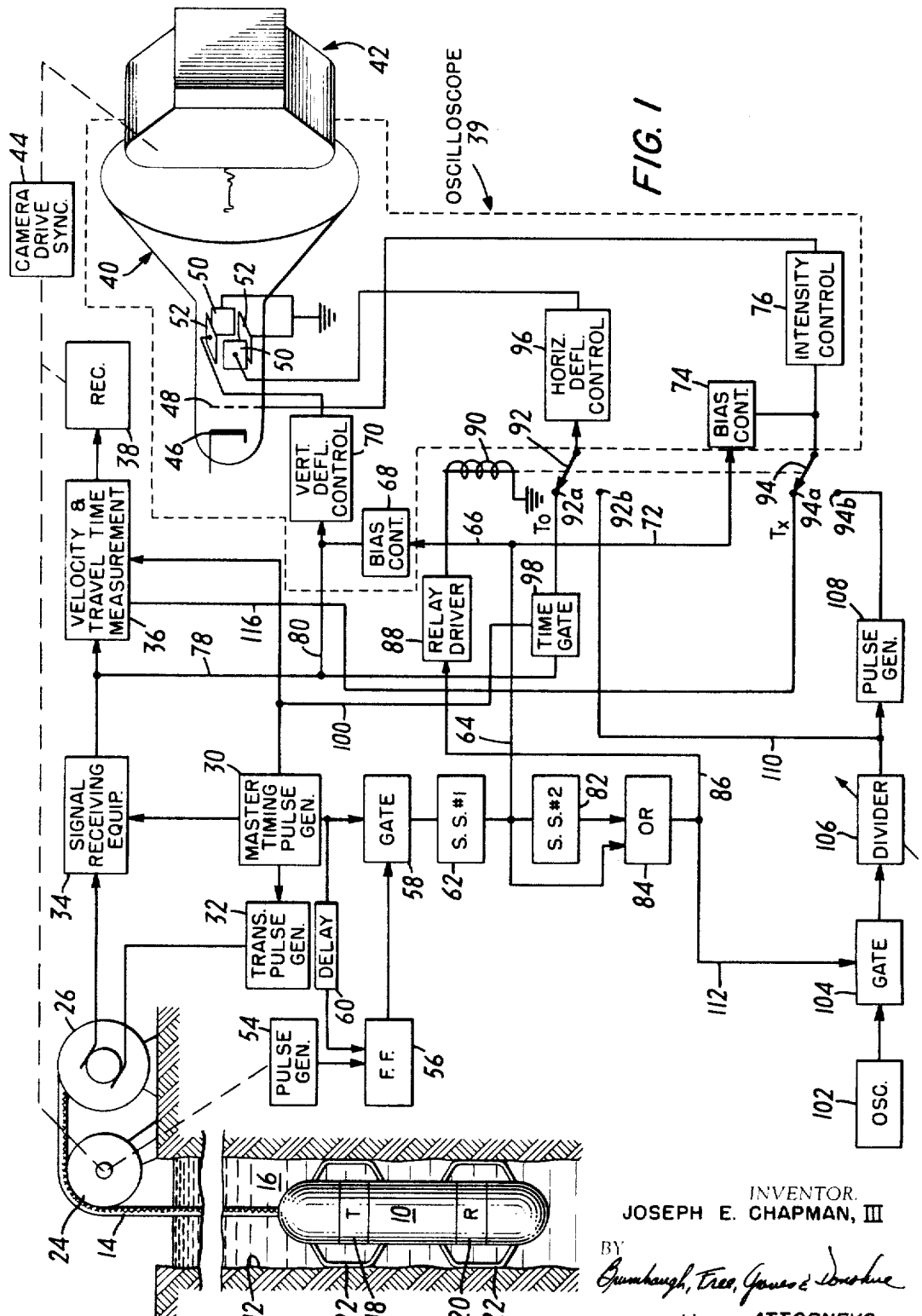
FIG. 1 is a block diagram of an acoustic logging system illustrating the display apparatus of the present invention.

Turning now to FIG. 1 of the drawings, a representative logging tool 10 is shown suspended by means of a multi-conductor cable 14 in a well bore 12 drilled in the earth. The well bore 12 may be filled with the usual fluid 16 and may be uncased, as shown, or cased.

For illustrative purposes, tool 10 is shown to be of a simple form, having a single acoustic transmitter 18 and acoustic receiver 20 supported in spaced apart relation thereon. Centralizers 22 are provided on the tool 10 to maintain it approximately centrally located within the well bore as it moves therethrough. It will be realized, of course, that other forms of logging tools employing more acoustic transmitters and receivers in varying combinations may be employed and the principles of the present invention will be equally applicable thereto.

In accordance with conventional techniques, the acoustic elements 18 and 20 may be of either magnetostrictive or piezoelectric type, the transmitter capable of emitting a burst of acoustic energy in response to an electrical pulse and the receiver capable of deriving an electrical signal from acoustic energy impinging thereon. As is understood in the art, at least a portion of the acoustic energy emitted by the transmitter 18 in response to a triggering pulse will be transmitted through the formations surrounding the borehole 12 and detected by the receiver 20. The electrical pulse for firing the transmitter may be generated at the surface and transmitted over the cable 14, and the electrical signals provided by the receiver 20 in response to acoustic energy may similarly be transmitted to the surface via the cable 14. The latter may conveniently be armored and of the multiconductor type, as is conventional in the art. The tool 10 may contain suitable electronic apparatus such as amplifiers, as required.

The cable 14 passes over a sheave 24 and then is wound on a drum 26. The sheave 24 is arranged to provide calibration of the length of cable paid out so that the depth in the well of the tool 10 may be determined at any given time. The drum 26 is provided with suitable connections, such as slip rings, to enable electrical connections to be made to the conductors of the cable 14.

During the usual logging operation, the tool 10 is lowered to the bottom of the well and then raised therethrough at a constant speed by the drum mechanism 26. As the tool rises through the borehole, the transmitter 18 is pulsed periodically and the received signals obtained in response to the transmitted pulses are sent to the surface. Generally, the surface apparatus includes a master timing pulse generator 30 which may be crystal controlled, or otherwise synchronized, to provide an accurately timed train of uniformly spaced pulses for synchronization purposes. A transmitter pulse generator 32 is triggered by the master pulse generator to send a pulse over the cable 14 to the transmitter to cause it to fire. Alternatively, the transmitter pulse generator 32 may be located in the tool 10 and the master timing pulses transmitted downhole.

The master pulse timing generator also controls the operation of the signal receiving equipment 34, which may be suitably gated to be responsive to the desired elements of the signal received from the downhole instrument to minimize noise and other spurious signals. The output of the signal receiving equipment, which may include for each transmitted pulse an indication of the time of occurrence of the acoustic transmitter pulse and the complete signal received in the receiver 20, is supplied to the input of apparatus 36 for providing a log of acoustic velocity (or incremental travel time) and travel time. Such apparatus may include means for determining the velocity of acoustic signals between the transmitter 18 and receiver 20 in the borehole for each increment of travel through the formations, as well as integrating arrangement for determining the travel time over extended lengths of borehole. One known type of such apparatus provides a pulse, designated as the $T_x$ signal, which is developed in response to a selected portion of the received acoustic signal, e.g. the first negative or positive peak, and affords a measurement of the time between the $T_0$ signal (representing the transmitter firing time) and the associated $T_x$ signal. The measurements provided by the apparatus 36 are provided at the input to a recording device 38 which, as indicated by the dashed line, is synchronized with the operation of the sheave 24 to provide a log correlated with depth in the well.

All of the foregoing described system is conventional in form and is discussed only briefly and in general terms to provide a representative background against which the apparatus of the present invention may be described. Various other acoustic logging arrangements are possible, as recognized by those skilled in the art, and the remainder of the description is to be read with that in mind.

Figure 2:
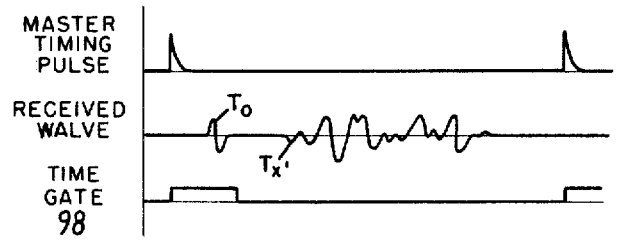
FIG. 2 is a series of wave forms helpful in explaining the operation of the logging tool illustrated in FIG. 1.

Turning for a moment to the wave forms of FIG. 2, the output of the master timing pulse generator 30 is indicated as a series of spaced relatively sharp pulses. These pulses trigger the transmitter pulse generator 32 which in turn causes actuation of the transmitter 18 in the downhole instrument. The received signal transmitted to the surface and available at the output of the signal receiving equipment 34 is shown as including an initial component $T_0$ representing the firing of the acoustic transmitter in the downhole instrument, and an alternating wave of varying amplitude representative of the acoustic energy impinging upon the receiver 20. The first $T_x'$ of the latter signal may be utilized to provide a pulse $T_x$ serving as the indication of the time of arrival of the acoustic impulse at the receiver for velocity and travel time measurements, as discussed above. For such logs then, the remainder of the received wave is disregarded. However, as discussed above, the complete received signal wave form provides valuable information concerning the nature of the formations surrounding the borehole and permanent records thereof may be used to advantage in geological exploration.

For each transmitted pulse, a wave form similar to that illustrated in FIG. 2 is provided by the receiver 20 and space between successive master timing pulses constitutes a measurement cycle. It has been found however, that because of the frequency of transmitter pulsing relative to the speed of movement of the tool through the well bore for conventional acoustic logging purposes, the successive received signals occur very close in time to one another. To permanently record every such signal on film would require a camera with a very high rate of film advance and an enormous length of film. Moreover, it has been found that while changes may occur in the received wave forms between successive pulses, these changes are generally very small and in many cases almost imperceptible. Accordingly, it has been found that highly satisfactory and informative results can be obtained by sampling the received wave at uniformly spaced intervals and photographing the sampled signals. This enables more conventional camera equipment to be used and results in a considerable saving in film. A sampling rate of one received signal for each foot of travel of the logging tool through the well bore has been found eminently suitable.

Returning now to the apparatus of FIG. 1, the surface equipment includes a conventional oscilloscope 39 (such as a Tektronix RM 504) for displaying the logging signal wave form, and a camera 42 for photographing the signal display as it appears on the phosphorescent screen of the cathode ray tube 40 of the oscilloscope. The film advance of the camera 42 is synchronized by means 44 with the movement of the logging tool through the borehole. Although for example only one signal per foot of travel of the tool is displayed on the face of the tube 40, it is not necessary for the film in the camera 42 advance one foot between exposures. It is required only that there be sufficient space between exposures so that the individual wave forms are separated from each other. Accordingly, the camera drive synchronization means 44 controls the film advance mechanism of the camera 42 such that the film advances, say two inches, for each foot of travel of the tool through the borehole. Alternately, the camera may be driven independently at a speed suitably related to the logging speed.

As represented in schematic form, the cathode ray tube 40 is conventional in form and includes an electron beam generating structure 46, an intensity control grid 48 which controls the brightness of the spot on the screen, and a deflecting system comprising horizontal deflecting plates 50 and vertical deflecting plates 52. One of each of the latter sets of plates may be connected to a reference potential such as ground. It will be understood, of course, that magnetic deflection may also be used. The circuitry to be described hereinafter produces on the screen of the cathode ray tube a set of equally spaced dots which serve as a time base in place of the graticule normally used on oscilloscopes, and, once for each foot of travel of logging tool, a visual representation of the complete acoustic logging signal such as shown in the wave forms of FIG. 2.

Returning now to FIG. 1, the electronic apparatus for producing the time base and acoustic signal display on the face of the cathode ray tube will be described. A pulse generator 54 is synchronized with the rotation of the sheave 24 to provide an output pulse for each foot of travel of the logging tool 10 through the well bore. The pulse generator may include, for example, a mechanical contactor linked to rotation of the sheave 24 such that it completes an electric circuit once for each foot of cable passing over the sheave. This in turn triggers an electronic circuit, such as a single shot multivibrator, to provide the electrical pulse output.

As indicated above, the operation of the acoustic transmitter and receiver in the logging tool occurs at a much higher rate than that of the sampling used to provide the visual display. Turning to the wave forms of FIG. 3, the relationship of the master timing pulses to the output of the pulse generator 54 is shown for comparative purposes. Thus, in a practical logging arrangement, for each foot of travel through the well bore of the logging tool, 20 individual travel time measurements may be made, but only one complete acoustic signal out of those used for the 20 measurements is selected for the visual display.

The output of the pulse generator 54 is used to change the state of a flip-flop circuit 56 which in turn opens a gate circuit 58. When open, the gate circuit 58 enables a pulse from the master timing pulse generator 30 to pass therethrough. The output of the pulse generator 30 is also conducted via a delay network 60 to the reset input of the flip-flop 56. The delay afforded by the circuit 60 is adjusted to be slightly less than the spacing between the output pulses from the generator 30. It will be seen then that after one master timing pulse it passed through the gate 38 but before the subsequent pulse arrives thereat, the flip-flop 56 is returned to its initial condition and the gate closed. Accordingly, one master timing pulse is selected for each foot of travel of the logging tool 10 and enables the display apparatus to be synchronized with the operation of the logging equipment.

The master timing pulse selected by the gate 58 is used to actuate a single shot multivibrator 62, indicated in the drawings as SS #1, whose output pulse length is equal to a substantial portion of the measurement cycle of the logging equipment so that it will encompass the complete received acoustic signal obtained from the borehole. The output pulse is applied via conductors 64 and 66 to the bias control network 68 for the vertical deflection control circuitry 70 of the cathode ray tube of the oscilloscope 39. It is also applied via conductors 64 and 72 to the bias control network 74 for the intensity control circuitry 76 of the tube. In response to the pulse, the bias control network 68 enables the normally non-responsive vertical deflection control circuitry 70 such that the electrical signal from the downhole equipment applied from the outpost of the signal receiving equipment 34 over conductors 78 and 80 will be effective to deflect the electron beam in the cathode ray tube in accordance with the amplitude of the logging signal.

The bias control 74 for the intensity control circuit 76 normally maintains the grid potential in the cathode ray tube at a level such that the beam does not produce a visible spot on the face of the tube. The output pulse from the single shot 62 overrides the bias and for the duration thereof renders the beam visible. It will be seen therefore, that for a time which will encompass the duration of the entire logging signal, the vertical deflection and intensity controls for the cathode ray tube are enabled and thus capable of providing a visual display of the logging signal. Between such enabling pulses, the vertical deflection control is completely inoperable while the intensity control permits the electron beam to produce a visual display only in the presence of additional signals applied to the intensity control 76.

Figure 3:
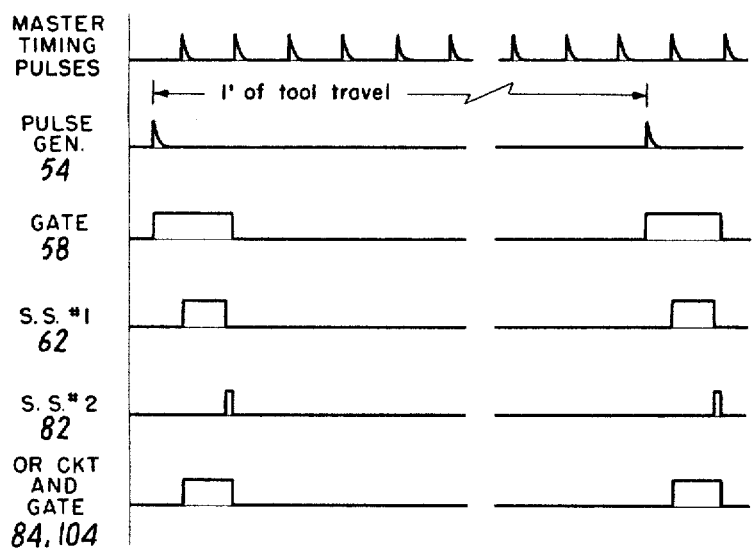
FIG. 3 is a series of wave forms illustrating the timing sequence for operation of the display apparatus.

The output of single shot 62 is also applied to trigger a second single shot 82 which provides a pulse having a short duration relative to the single shot 62; see FIG. 3. The outputs of both single shots 62 and 82 are furnished as inputs to an OR circuit 84 which thus provides an output for a period equal to the sum of the pulse lengths of the single shots 62 and 82.

The output of the OR circuit 84 is applied over conductor 86 to actuate a relay driver circuit 88. The latter energizes a relay coil 90 having associated armatures 92, 94. With the coil 90 energized, the armatures 92 and 94 are in the position shown on contacts 92a and 94a respectively. In the nonenergized condition, the armatures return to contacts 92b and 94b respectively. The armature 92 is connected to the triggering input for the horizontal deflection control circuit 96 of the oscilloscope 39, to provide a horizontal sweep voltage for the cathode ray tube in response to a triggering pulse, in well known manner.

The logging signal available on conductor 78 is also coupled to the input of a normally closed (i.e. nonconducting) time gate circuit 98. The selected master timing pulse from the pulse generator 30, which is indicative of the beginning of the measurement cycle of the logging equipment, is coupled via conductor 100 to control the gate 98. As shown in FIG. 2, the time gate 98 is arranged to open in response to the master timing pulse for a period sufficient to permit the $T_0$ portion of the logging signal to be conducted therethrough to the contact 92a, and thence through the armature 92a to the triggering input of the horizontal deflection circuitry 96. Accordingly, the horizontal deflection or sweep circuits are caused to operate by the leading edge of the $T_0$ pulse and, since the vertical deflection and intensity control circuits have already been enabled (by the output of single shot 62) the complete logging signal wave form received on the downhole equipment is reproduced visually on the face of the cathode ray tube. The camera 42, running continuously, will thus photograph the wave form appearing on the face of the tube.

As indicated above, one of the principal features of the present invention is the provision of a time base grid on the face of the cathode ray tube provided by the electron beam itself and synchronized with the remainder of the circuit such that both electronic and optical distortions will be cancelled out. A crystal oscillator 102 provides an accurately controlled frequency output through a normally open gate 104. The signal is then transmitted through a variable frequency divider network 106 and the reduced frequency output applied to the input of pulse generator 108. The latter produces a train of pulses having a repetition frequency equal to the frequency at the divider output. The output of the pulse generator 108 is coupled to contact 94b. The frequency divider output is coupled via conductor 110 to contact 92b on the relay structure.

With the relay contacts 92 and 94 in the upper positions as shown, the outputs of the divider 106 and the pulse generator 108 are ineffectual. However, the armatures 92 and 94 are in their upper positions only for a period equal to the duration of the output of OR circuit 84. The output of the latter is also applied over conductor 112 to close the normally open gate 104 for its duration. Consequently, during the period of the output of the OR circuit 84, the time base generating arrangement has no effect on the visual display provided on the face of the cathode ray tube.

At the conclusion of the output of OR circuit 84, the gate 104 is reopened to conduct the output of oscillator 102 through the divider 106 and to the pulse generator 108. Relay coil 90 is de-energized, whereby the armatures 92 and 94 return to contacts 92b and 94b respectively. Movement of the armature 92 shifts actuation of the horizontal deflection control circuitry 96 from the $T_0$ portion of the received signal to the output of the divider 106. Similarly, the return of armature 94 to contact 94b provides a series of pulses from the pulse generator 108 to the intensity control circuitry 76. It should be noted at this point, that the bias control 74, which is dependent upon the output of the single shot 62, was returned to its normally disabling state slightly before the de-energization of the relay coil 90. Accordingly, visual images will appear on the face of the tube only in response to the pulses from the pulse generator 108.

The vertical deflection control circuitry 70 is also inactive during this period since the enabling bias control network 68 becomes inactive at the conclusion of the pulse from the single shot 62.

With the relay coil 90 de-energized, horizontal deflection of the cathode ray tube beam is triggered by the output of the frequency divider 106. As is understood in the art, the horizontal deflection is provided by a sawtooth or trapezoidal voltage applied to the horizontal deflecting plates of the tube. The magnitude of the sweep, i.e. the extent to which the beam is swept across the face of the cathode ray tube may be controlled readily by adjusting the parameters of the sweep voltage generating circuit. As is conventional, the sweep generating circuits as employed in oscilloscopes are made responsive to a triggering voltage to initiate the sweep. Once begun however, the generator will be insensitive to pulses applied to the triggering input during the sweep cycle. Upon termination of the sweep and return of its starting potential, the circuit again becomes sensitive and will begin the sweep cycle on the next impulse provided thereto. Accordingly, as soon as the horizontal sweep generating circuit has returned to its initial condition after switch arm 92 is returned to contact 92b, the first voltage excursion from the divider 106 applied thereto will initiate a sweep cycle. Subsequent voltage excursions from the divider 106 applied during the sweep cycle will produce no effect on the sweep generator. At the conclusion of its predetermined sweep, it returns to its initial condition to be again responsive to the next voltage excursion.

Simultaneously with the beginning of the horizontal sweep, pulse generator 108 applies a pulse to the intensity control circuitry 76 which overcomes the disabling bias control established by 74. This produces a bright spot on the screen of the cathode ray tube. Similarly, for each pulse provided by the generator 108 to the intensity control circuit 76 during the horizontal sweep cycle, a bright spot will be produced on the tube face. Since the pulses in the train produced by the generator 108 are accurately spaced with respect to time, the light dots produced on the face of the cathode ray tube similarly will be evenly spaced in time. However, because the horizontal sweep voltage will ordinarily not be perfectly linear, the physical spacing of the dots on the tube face will not be exactly equal. The same sweep distortion will also apply to the signal waveform produced on the tube and, accordingly, the time spacing of the dots will be true. As will be appreciated, by preselecting the magnitude and speed of the horizontal sweep, and the frequency of the pulse generator (by adjusting the divider 106), the facing between successive dots produced on the tube face may be made to correspond to a given period of time.

Figure 4:
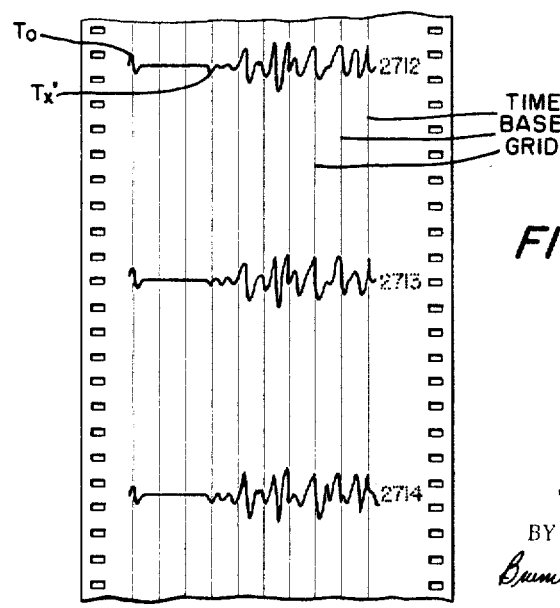
FIG. 4 is an example of the film strip produced with the apparatus of FIG. 1.

During the period between logging signal samplings, the series of timing dots are repetitively produced on the face of the cathode ray tube in the manner described above. Because of the high frequency at which the dot series are produced on the tube face relative to the rate of film advance, and the persistence of the phosphor on the tube face, these dots will photograph as substantially continuous vertical lines and the film strip will appear as shown in FIG. 4. As indicated therein, ten timing divisions are used and the successive logging signals are spaced by a distance representing one foot of travel in the borehole. Returning to the operation of the circuit, it will be recalled that the relay 90 and the OR circuit 84 insure that during the sampling portion when the logging signal is to be reproduced on the face of the tube, the time base generating apparatus is rendered inoperative. Accordingly, during generation of the logging signal trace, brief breaks in the time grid lines will appear.

Since the particular characteristic of the received acoustic signal used to generate the $T_x$ signal is of significance to the operator, the apparatus may also include means to brighten the signal trace at the appropriate point so that it will be readily discernible on the film strip. The $T_x$ pulse signal provided in the measurement apparatus 36, as disclssed above, is applied over conductor via contact 94a and armature 94 to the intensity control circuitry 76. Since at the same time, the logging signal is being traced on the face of the tube, the $T_x$ pulse superimposes a brighter spot on that portion of the signal corresponding to the portion of the acoustic signal utilized for the incremental travel time measurement. This is shown in FIG. 4. Thus, the operator can readily detect from the film strip which portion of the acoustic signal is being used for the incremental travel time measurement in the log then in progress.

To aid in interpreting the film strip produced by the aforementioned apparatus, the camera equipment may be provided with a numbering arrangement synchronized with the movement of the logging tool through the borehole such that the depth in the well represented by each measurement is reproduced on the film strip itself. In one practical embodiment, a Beattie Coleman 70 millimeter camera was utilized for making the film strip and was provided with a counter comprising a bank of display devices which produced lighted numerals. The numerals were changed successively for each foot of travel and the film strip was exposed to the lighted numeral momentarily at a time coincident with each of the samplings. Thus, the depth in the well was reproduced directly on the film strip, as shown in FIG. 4.

As indicated in FIG. 1, the film advance of the camera 42 is synchronized with the movement of the logging tool through the well bore. This may be accomplished in several ways. A direct mechanical drive, through a speed reducing arrangement may be provided, or the linkage may be through a selsyn transmitter and selsyn receiver. Alternatively, independent drives for the tool and the camera may be provided and the speeds of each of them controlled to provide the required correlation. If desired, the camera drive may be controlled in such a manner to stop the film advance during generation of the acoustic signal traces, and moving the film in the usual manner during application of the time base dots.

It will be seen from the foregoing, that the present invention provides improved methods and apparatus for providing a visual record of actual logging signals obtained in a well bore, which indication is provided with an accurate time base grid enabling precise analysis of the wave forms. Although a simple logging arrangement utilizing the invention has been described for purposes of illustration, it will be apparent that the basic principles and structure of the invention are readily adaptable to a wide range of acoustic logging techniques. Various combinations and number of acoustic transmitters and receivers can be readily accommodated by the apparatus described with but simple modifications. Of course, many variations of the individual details of the invention may be made without departing from the spirit thereof. Accordingly, the invention is not to be limited except as set forth in the appended claims.

I claim:

1. A method of producing a record correlated with depth of acoustic logging signals obtained periodically from a logging tool moving at a predetermined speed through a well bore traversing earth formations comprising the steps of, producing impermanent visual displays on a display device of selected ones of said acoustic signals as they are obtained from the logging tool, generating a series of pulse signals having a predetermined spacing, between successive displayed acoustic signals producing along a line traversing said display device a visual display corresponding to said pulse signals to provide a series of visible time base indicia, and photographing the output of said display device to provide a continuous record of said acoustic signal displays with associated time base indicia.

2. A method of producing a record correlated with depth of acoustic logging signals obtained periodically from a logging tool moving at a predetermined speed through a well bore traversing earth formations comprising the steps of, selecting a single one of said periodically obtained signals for each predetermined distance of travel of the tool through the well bore, producing successive impermanent visual displays of said selected signals on the face of a cathode ray tube, generating series of pulse signals having a preselected spacing, applying said pulse signals to said cathode ray tube only between said successive impermanent displays to produce a series of visible time base indicia along a line traversing said tube face, and photographing the face of said cathode ray tube to provide a continuous record of said acoustic signal displays with associated time base indicia.

3. A method of producing a record correlated with depth of acoustic logging signals obtained periodically from a logging tool moving at a predetermined speed through a well bore traversing earth formations, each of said logging signals including a first portion representing the actuation of an acoustic wave transmitter and a second portion spaced therefrom having alternating positive and negative going peaks of varying amplitude representing the acoustic wave detected by an acoustic wave receiver, said method comprising the steps of, selecting a single one of said periodically obtained logging signals for each predetermined distance of travel of the tool through the well bore, producing successive impermanent visual displays of said selected signals on a cathode ray tube, generating a series of pulse signals having a repetition frequency correlated with the time durations of said individual logging signals, applying said pulse signals to said cathode ray tube only between said successive impermanent displays to provide a series of visible time base indicia along a line traversing said tube, and photographing the output of said cathode ray tube to provide a continuous record of said acoustic signal displays with associated time base indicia, whereby said indicia enable direct determination of the time spacing between components of said first and second signal portions.

4. Apparatus for making a continuous, visually interpretable record of a succession of periodically occurring signal waveforms having a predetermined time base comprising, a source of periodically occurring signal waveforms, a cathode ray oscilloscope, means for coupling said signal waveforms to said oscilloscope to produce visible representations thereof, means for generating a pulse train having a periodicity related to said predetermined time base, means for applying said pulse train to said oscilloscope to repetitively produce thereon a series of visible dots between successive waveform representations, and means for photographing the visible output of said oscilloscope on a moving film strip.

5. Apparatus for making a continuous, visually interpretable record of a succession of periodically occurring signal waveforms having a pretermined time base comprising, a source of periodically occurring signal waveforms, a cathode ray oscilloscope having a vertical and horizontal deflection means and an intensity control, means for coupling said signal waveforms to said vertical deflection means, means normally rendering said vertical deflection means inoperative, means for generating a pulse train having a periodicity related to said predetermined time base, switch means normally closed to couple said pulse train to said intensity control to repetitively produce a series of visible, horizontally spaced dots on said oscilloscope, periodically operative circuit means for rendering said vertical deflection means operative and for opening said switch means to decouple said pulse train from said intensity control during the time of occurrence of each of said waveforms, whereby visible representations thereof are produced on said oscilloscope, and means for photographing the visible output of said oscilloscope on a moving film strip.

6. Apparatus for making a continuous, visually interpretable record of a succession of periodically occurring signal waveforms having a predetermined time base comprising, a source of periodically occurring signal waveforms, a cathode ray tube having a viewing surface, circuit means coupled to said cathode ray tube and responsive to said waveforms to produce visible representations thereof as they occur on said viewing surface, pulse generator means for providing a pulse train having a periodicity related to said predetermined time base, means responsive to said pulse train to repetitively produce on said viewing surface a series of visible dots between successive waveform representations, said dots extending along a line traversing said viewing surface in a direction corresponding to the time base of said waveform representations, and means for exposing a continuously moving, photosensitive recording medium to said viewing surface, said recording medium moving in a direction perpendicular to said time base direction.

7. Apparatus according to claim 6 above wherein said means responsive to said pulse train produces said series of visible dots at a rate such that corresponding dots in successive series are effectively overlapping, whereby said recording medium produces a substantially continuous line for each dot.

8. Apparatus for making a continuous, visually interpretable record of a succession of periodically occurring signal waveforms having a predetermined time base comprising, a source of periodically occurring signal waveforms, a cathode ray tube having a viewing surface, vertical and horizontal deflection means for said tube, means for rendering said vertical deflection means inoperable except during the occurrence of a signal waveform, means for coupling said signal waveforms to said cathode ray tube to produce visible representations thereof on said viewing surface, pulse generator means for providing a pulse train having a periodicity related to said predetermined time base, means responsive to said pulse train to repetitively produce on said viewing surface a series of visible dots between successive waveform representations, and means for exposing a continuously moving, photosensitive recording medium to said viewing surface.

9. For use with an acoustic logging tool adapted to be moved through a well bore traversing earth formations at a predetermined speed, said tool including an acoustic wave transmitter for periodically emitting pulses of acoustic energy into said formations and an acoustic wave receiver responsive to acoustic energy from said formations impinging thereon to produce electrical signals corresponding thereto, apparatus for recording said electrical signals comprising, cathode ray tube means for producing a visual display of the waveform of an electrical signal applied thereto, means for applying selected ones of the electrical signals from said acoustic wave receiver to said cathode ray tube means, means for producing a series of visual calibration dots across said cathode ray tube between application of said selected electrical signals to said cathode ray tube means, and means for providing a continuous permanent reproduction of the visual display as said logging tool moves through said bore.

10. For use with an acoustic logging tool adapted to be moved through a well bore traversing earth formations at a predetermined speed, said tool including an acoustic wave transmitter for periodically emitting pulses of acoustic energy into said formations and an acoustic wave receiver responsive to acoustic energy from said formations impinging thereon to produce electrical signals corresponding thereto, apparatus for recording said electrical signals comprising, oscilloscope means for producing a visual display of the waveforms of an electrical signal applied thereto, said oscilloscope means having horizontal and vertical deflection means, means for rendering said vertical deflection means inoperative except during the application of an electrical signal from said receiver, means for applying selected ones of said electrical signals from said receiver to said oscilloscope means to provide a visual display thereof, means for providing a train of pulses having a periodicity related to a characteristic of said electrical signals, means for applying said pulses to said oscilloscope means to repetitively produce thereon a series of spaced, visible calibration dots between successive waveform displays, and means to continuously reproduce the visual display on said oscilloscope as said tool moves through said bore to provide a record thereof correlated with depth in the well bore.

11. For use with an acoustic logging tool adapted to be moved through a well bore traversing earth formations at a predetermined speed, said tool including an acoustic wave transmitter for periodically emitting pulses of acoustic energy into said formations and an acoustic wave receiver responsive to acoustic energy from said formations impinging thereon to produce electrical signals corresponding thereto, apparatus for recording said electrical signals comprising, oscilloscope means for producing a visual display of the waveform of an electrical signal applied thereto, said oscilloscope means having horizontal and vertical deflection means, means rendering said vertical deflection means normally inoperative, pulse generating means synchronized with the operation of said acoustic transmitter for rendering said vertical deflection means operative for the durations of selected ones of the electrical signals from said receiver, means for applying said selected electrical signals to said oscilloscope means to provide a visual display thereof, means for providing a train of pulses having a periodicity related to a characteristic of said electrical signals, means for applying said pulses to said oscilloscope means between said selected electrical signals to repetitively produce thereon a series of spaced, visible calibration dots, and means to make a continuous reproduction of the visual display provided on said oscilloscope as said tool moves through said bore to produce a record thereof correlated with depth in the well bore.

12. Apparatus according to claim 11 further comprising means to vary the periodicity of said train of pulses whereby the spacing of said calibration dots may be altered.

13. A method of producing a record correlated with depth of acoustic logging signals obtained periodically from a logging tool moving through a well bore traversing earth formation comprising the steps of, selecting a single one of said periodically obtained signals for each predetermined distance of travel of the tool through the well bore, producing successive impermanent visual displays of the amplitude of said selected signals versus time on the face of a cathode ray tube, generating series of pulse signals having a preselected spacing, applying said pulse signals to said cathode ray tube only between successive impermanent displays to produce a series of visible time base indicia along a line traversing said tube in the same direction as the time axis of said visual signal displays, and photographing the output of said cathode ray tube on a film strip moving in a direction perpendicular to said time axis to provide a continuous record of said acoustic signal displays with associated time base indicia.

14. Apparatus for investigating earth formations surrounding a well bore comprising: a well tool adapted for travel through a well bore and including means for providing signals representative of the characteristics of such earth formations, surface located monitoring means for displaying visual representations of such signals, photographic recording means including a moving film strip adapted for photographing said visual representation, said recording means being adapted for moving said film strip at a speed lower than the travel speed of said well tool through said well bore, and means responsive to movement of said well tool for periodically displaying selected signals from said well tool on said monitoring means and operating said recording means to obtain a photographic record thereof at spaced depth intervals.

15. Apparatus for investigating earth formations surrounding a well bore comprising: a well tool adapted for travel through a well bore and including means for providing signals representative of the characteristics of such earth formations, surface located monitoring means for displaying visual representations of such signals, photographic recording means including a moving film strip adapted for photographing said visual representation, said recording means being adapted for moving said film strip at a speed lower than the travel speed of said well tool through said well bore, actuating means adapted for periodically actuating said well tool, to provide said signals and means responsive to movement of said well tool for operating said recording means at a periodic rate that is greater than the periodic rate of said tool actuating signals.

References Cited

UNITED STATES PATENTS

| | | | |
|---|---|---|---|
| 2,858,475 | 10/1958 | Blake | 346—110 |
| 3,065,404 | 11/1962 | Mayes et al. | 346—33 |
| 3,170,136 | 2/1965 | Howes | 340—18 |
| 3,233,214 | 2/1966 | Bennett et al. | 340—15.5 |
| 3,243,009 | 3/1966 | Vogel | 340—18 X |
| 3,252,131 | 5/1966 | Vogel | 340—18 |
| 3,302,165 | 1/1967 | Anderson et al. | 340—18 |

BENJAMIN A. BORCHELT, *Primary Examiner.*

SAMUEL FEINBERG, *Examiner.*

R. M. SKOLNIK, *Assistant Examiner.*